United States Patent [19]
Ainsworth et al.

[11] 3,814,940
[45] June 4, 1974

[54] PORTABLE HAND HELD DOSIMETER

[75] Inventors: Glenn C. Ainsworth, Albuquerque, N. Mex.; Marion F. Schneider, Palos Verdes Peninsula, Calif.

[73] Assignee: The United States of America as represented by the Secretary of the Air Force, Washington, D.C.

[22] Filed: July 25, 1972

[21] Appl. No.: 275,022

[52] U.S. Cl................ 250/389, 250/394, 250/252, 324/33
[51] Int. Cl............................................. G01t 1/02
[58] Field of Search........... 250/83 PD, 83.6 R, 394, 250/252, 389; 324/33

[56] References Cited
UNITED STATES PATENTS

| | | | |
|---|---|---|---|
| 2,596,080 | 5/1952 | Raper et al. | 250/83.6 R |
| 2,736,817 | 2/1956 | Bell | 250/83.3 PD |
| 2,769,098 | 10/1956 | Dunham | 250/83.6 R |
| 3,185,844 | 5/1965 | Bess | 250/83.6 R |
| 3,223,843 | 12/1965 | Westerkowsky | 250/83.6 R |
| 3,614,444 | 10/1971 | Nirschi | 250/83.6 R |

*Primary Examiner*—Archie R. Borchelt
*Assistant Examiner*—Harold A. Dixon
*Attorney, Agent, or Firm*—Harry A. Herbert, Jr.; Henry S. Miller

[57] ABSTRACT

A portable light weight hand held dosimeter for measuring both dose rate and total dose received. Dose rate is sensed then amplified by a logarithmic electrometer, the signal is processed through a differential amplifier and provides a reading on a calibrated voltmeter. Total dose is sensed and generates a voltage to charge a capacitor, which activates a field effect transistor network, the output is amplified in a compound transistor amplifier which drives a mechanical register.

2 Claims, 6 Drawing Figures

PORTABLE HAND HELD DOSIMETER

BACKGROUND OF THE INVENTION

This invention relates generally to a portable hand held dosimeter and more specifically to a light weight dosimeter that measures both dose rate and total dose of harmful radiation.

The need for dosimeters by those working in the field of dangerous radiation has been well established. In general, these instruments take the form of boxes containing detecting elements, batteries and associated circuits. Usually one box is used for measuring dose rate, while another is used to measure total dose. For laboratory or factory use where radiation fields are limited by strict safety requirements prior art devices perform with reasonable adequacy. However, where radiation must be detected away from a controlled environment in a mixed radiation field, known instruments become less than completely ideal. When further limitations are imposed, such as size, weight and ruggedness, these instruments fail to meet expected standards.

General areas where such standards might be imposed would be, for example, in manned space exploration where size, weight and ruggedness are of primary importance. These standards also apply to military applications where dosimeters might be used in aircraft monitoring, as well as for the individual foot soldier who might be required to assess mixed field radiation at some time.

Until this invention, no suitable radiation measuring device having the aforementioned characteristics was available to enable those working in mixed fields of radiation to quickly and accurately determine their dose rate and total accumulated dose.

SUMMARY OF THE INVENTION

The invention is a portable hand held dosimeter that measures both dose rate and the total dose of radiation received. The invention features two separate electronic subsystems, one subsystem is utilized to measure dose rate and will be referred to as the dose rate subsystem, and the other measures total or accumulated dose, and is labeled the total dose subsystem.

The two subsystems operate from a single sensor in the form of a tissue equivalent ionization chamber employed in the Bragg Gray mode. The utilization of this single sensor allows the dose or dose rate to be recorded in a manner that precisely simulates the absorbed energy that would be received by the muscle tissue of the human body.

The muscle tissue equivalency is simulated by using a carefully designed sensor having a wall material and filling gas that automically (chemically) closely matches human muscle tissue as defined by the International Committee on Radiological Units (ICRU). When the appropriate electronic signals are derived from the radiation detector they are controlled and amplified in the appropriate electronic subsystem to provide a meaningful output in digital or analog form.

It is therefore an object of the invention to provide a new and improved means for measuring radiation.

It is another object of the invention to provide a new and improved radiation measuring means that is relatively compact, rugged and light weight.

It is a further object of the invention to provide a new and improved radiation sensing means that is able to be easily held in one hand.

It is still another object of the invention to provide a radiation measuring means that senses mixed radiation fields.

It is still a further object of the invention to provide a radiation dosimeter that will measure a broader range of harmful radiation than any hitherto known.

These and other advantages, features and objects of the invention will become more apparent from the following description taken in connection with the illustrative embodiment in the accompany drawings.

DESCRIPTION OF THE PREFERRED EMBODIMENT

Figure 1:
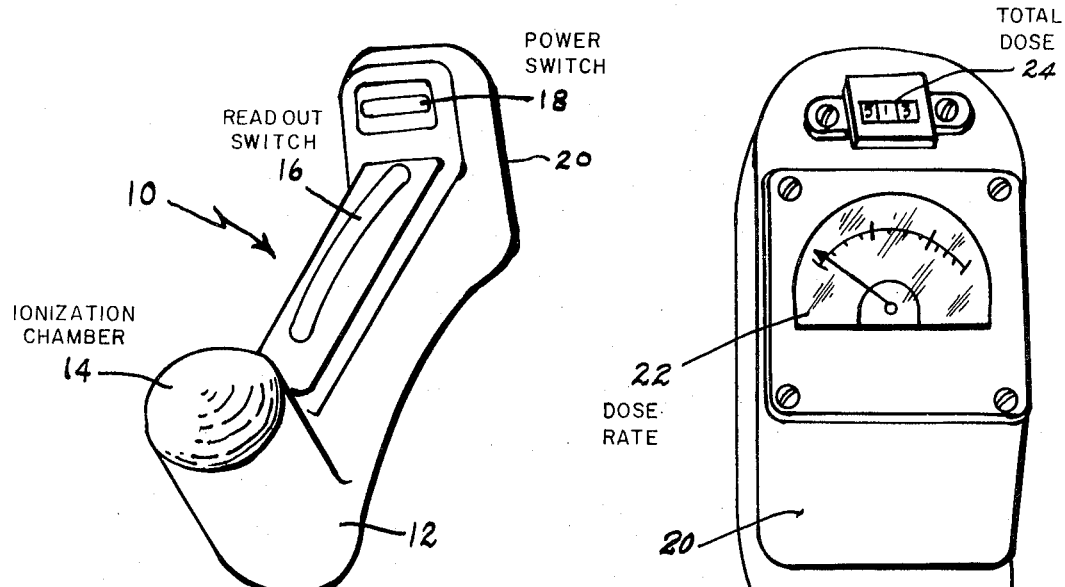
FIG. 1 is a perspective view of the invention.

Referring now to FIG. 1, the invention is shown generally at 10 and consists of a plastic outer case 12 having an ionization chamber 14 at one end. A meter readout switch 16 is situated on the upper side of the elongated body of the instrument. An on-off switch 18 is located at the end opposite from the ionization chamber and indented in the case to prevent accidental switching of the device. The analog and digital readouts for the instrument are located on face 20.

Figure 2:
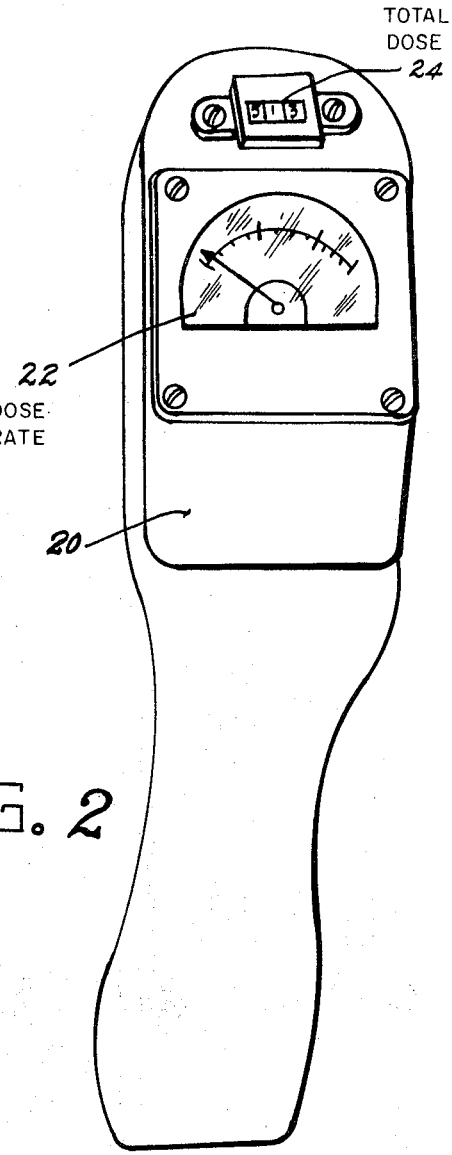
FIG. 2 is an end view of the invention showing the output display.

FIG. 2 shows in detail the information bearing instruments mounted in the case. A dose rate meter 22 is positioned on the face 20 and is calibrated in rads per hour. The meter 20 is normally "off," although the instrument power switch 18 is in the on position. To activate the meter 22, it is necessary to depress the meter readout switch 16.

A total or accumulated dose readout is shown by the digital meter 24 which provides information regarding total dose and functions when the switch 18 is in the "on" position.

Figure 3:
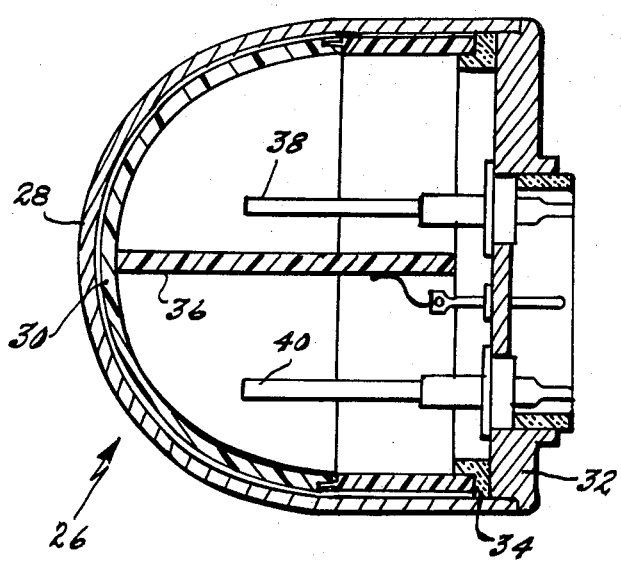
FIG. 3 is a cross sectional view of the sensor.

In FIG. 3 is seen a cross section view of the ionization chamber 14 of FIG. 1. The hemispherical shell generally shown at 26 is constructed of an aluminum outer protective shell 28 and an inner shell 30. The inner shell could be formed of commercially available Shonka-Type A-150 plastic or other suitable material. The outer shell is sealed by an aluminum base 32 and the inner shell is supported by an epoxy glass ring 34. The ionization chamber is provided with three electrodes. Electrode 36 acts as the electrical common, while it forms a partition dividing the chamber into two subchambers. The remaining electrodes 38 and 40 are independent collecting electrodes for the total dose and dose rate subsystems and each extends into one of the subchambers.

The entire ionization chamber is filled with a tissue equivalent gas, at standard atmospheric pressures made of 33 percent methane, 3 percent nitrogen and 64 percent carbon dioxide and is conventional and commercially available.

Figure 4:
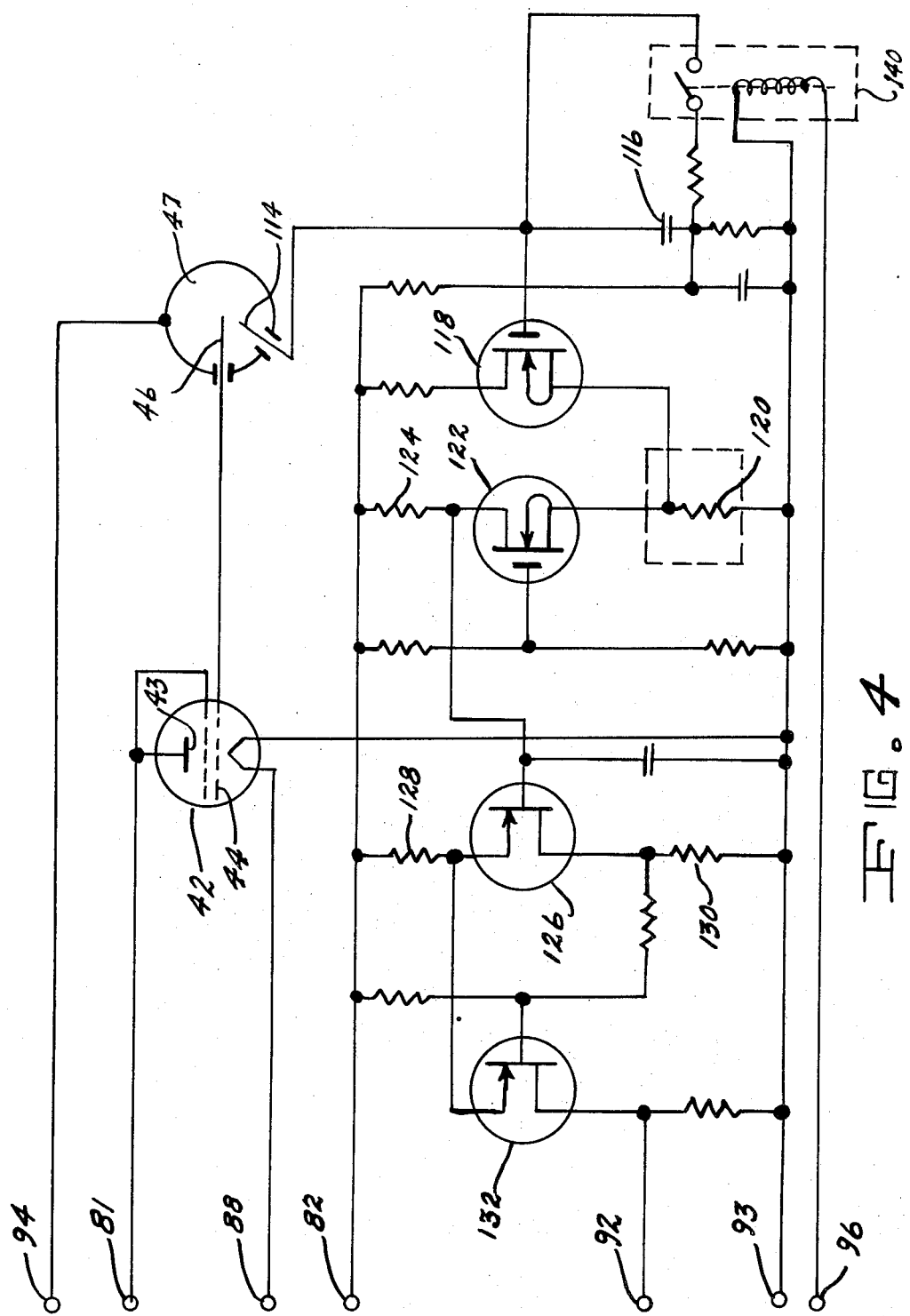
FIG. 4 is a circuit diagram including the sensor and amplifier.
Figure 5:
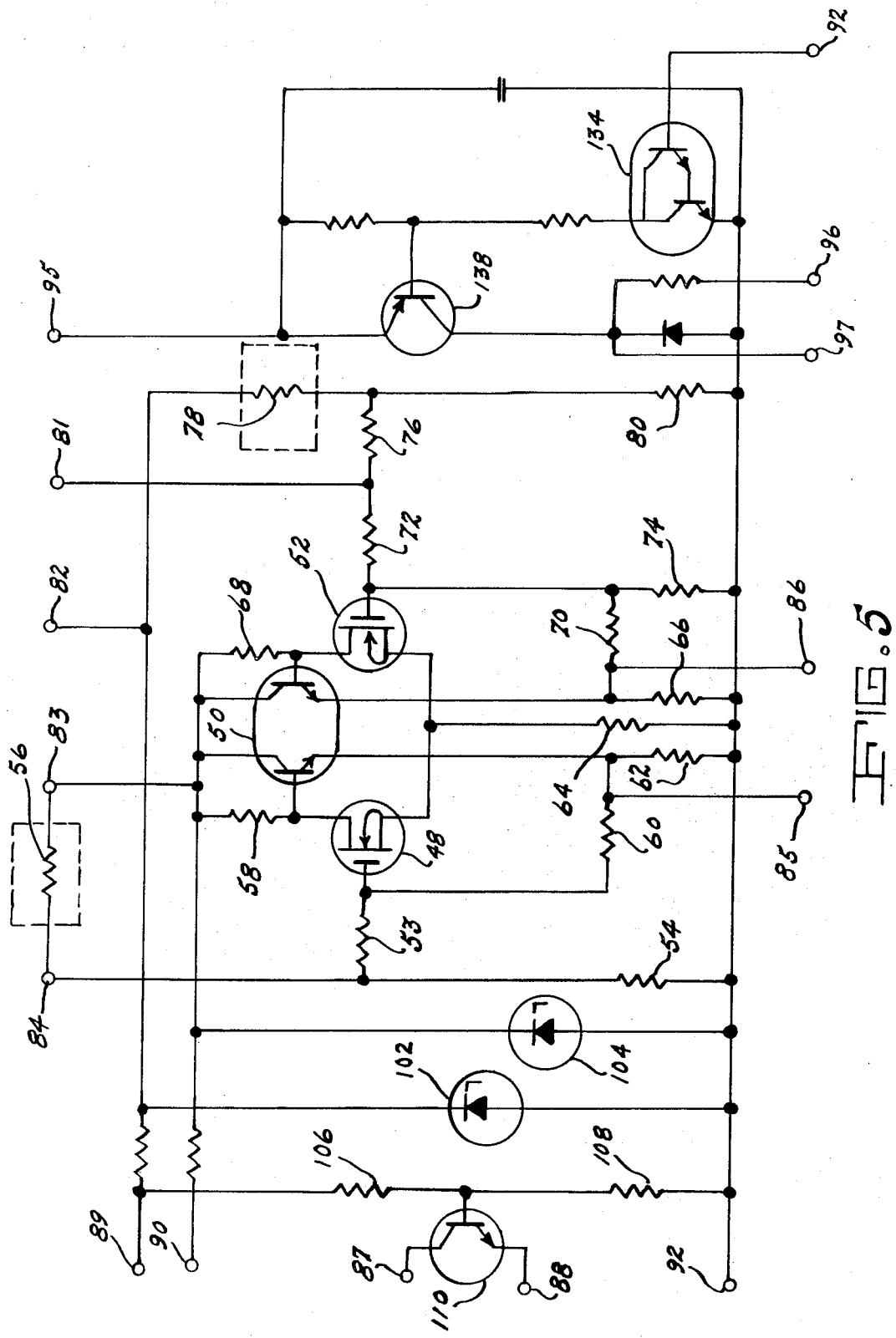
FIG. 5 is a circuit diagram of the amplification and shaping electronics.
Figure 6:
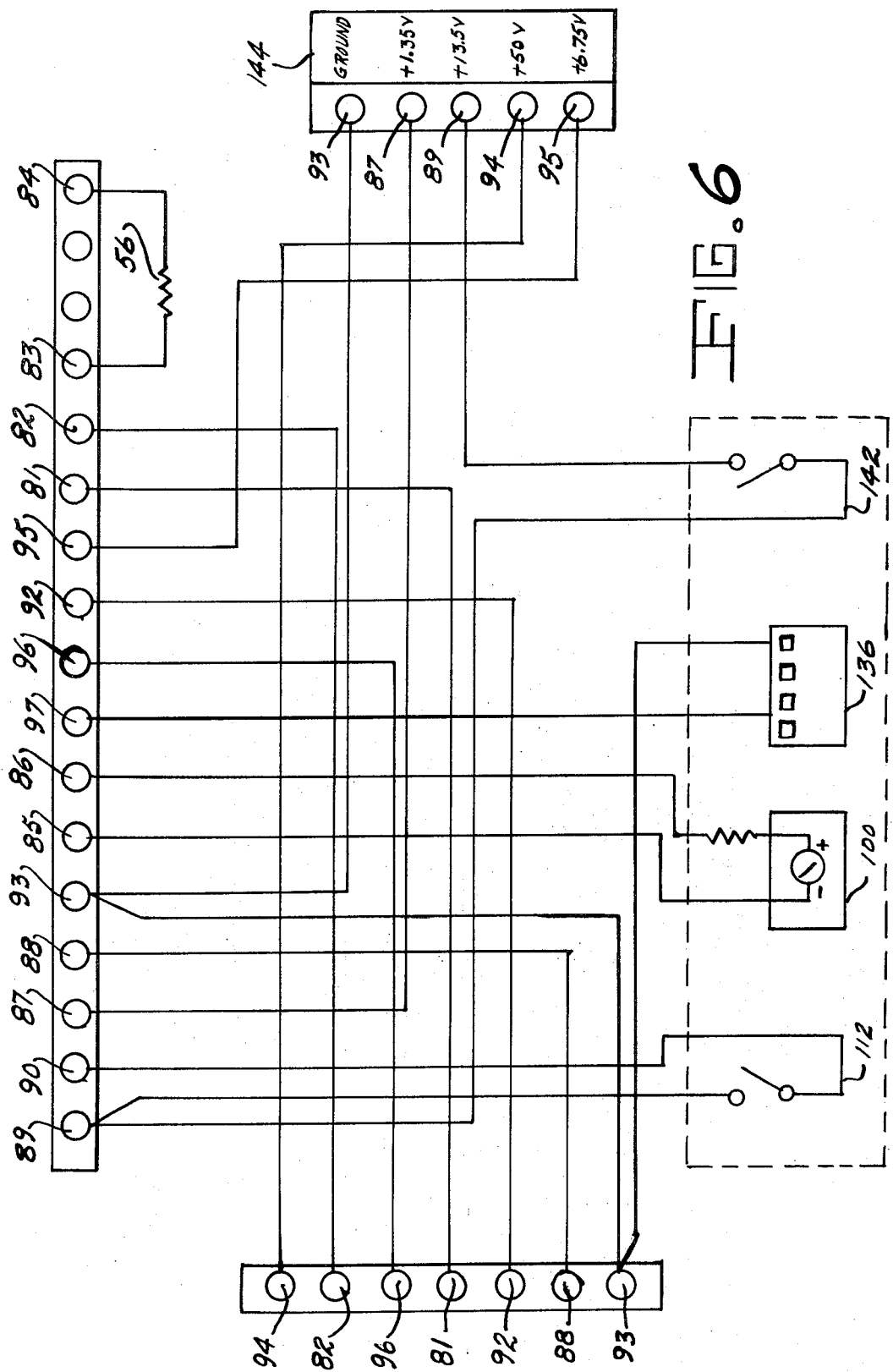
FIG. 6 is the interconnecting wiring diagram for the circuits of FIGS. 4 and 5.

The electronic circuitry of the subsystems are shown in FIGS. 4, 5 and 6. The does rate system consists of a Raytheon CK5889 logarithmic electrometer 42 whose grid 44 is connected to one of the tissue equivalent sensor collecting electrodes 46 in the ionization chamber 47. The grid current varies between $10^{-14}$ and $10^{-7}$ amperes, depending on the radiation levels impinging on the sensor, it is amplified by the logarithmic electrometer and appears nominally as a few hundred microamperes of plate current for additional amplification and shaping prior to a meter recording. Hence, changes in the grid current resulting from radiation induced ionization currents are amplified and recorded by the electrometer as a logarithmic function. Mathmatically, the plate current is related to the grid current by the empirical function:

$$i_{plate} = [4.4(\log i_{grid}) + 95]3/2$$

The dose rate (proportional to grid current), therefore, is measurable over approximately seven orders of magnitude, giving rise to extraordinary dynamic range. The range for practical purposes is then limited only by meter range, a function of meter type and size.

The plate voltage of the electrometer tube 42 is further amplified and shaped with respect to ground. FIGS. 5 and 6 taken together with FIG. 4 show this amplification. A conventional differential amplifier consisting of transistors 48, 50 and 52, and a network of resistors 53 through 80 is employed for this purpose. The tube plate (43) current is input (81) to the differential amplifier. The plate bias voltage 82 is connected with resistors 76, 78, and 80, and establishes the 6.5 volt nominal plate voltage. Adjustable resistor 56 (83 and 84) is used as a zero adjust for the meter. This is required, since even at zero radiation, the electrometer produces considerable plate current due to leakage currents and tube noise, and would give false radiation readings. Resistor 56 is selected to balance out the plate current at a zero radiation level. The value varies with each electrometer since tube characteristics are slightly different for each tube.

Resistor 58 is the same as resistor 68, likewise resistor 53 is the same as resistor 72, and are selected to provide proper operating levels for field effect transistors 48 and 52. Resistors 60 and 70 are symmetric resistors and provide D.C. feedback for 50 the matched differential pair. Resistors 62 and 66 are the symmetric emitter load resistors. A drain resistor for the differential amplifier is provided at 64.

The amplified signal from the differential amplifier is connected at 85 and 86 to a 0.0 to 5.0 volt meter 100. The voltage is calibrated against a known radiation level in rads per hour. Some adjustment in radiation range is possible by varying resistor 78. A higher resistor value would increase upper radiation of the instrument. Conversely a lower value would make the instrument more sensitive to low doses.

Zener diodes 102 and 104, resistors 106 and 108, along with transistor 110, form a small voltage regulator for the filament voltages 87 and 88 to the electrometer tube. This regulation insures a steady 1.35 volt filament supply to the tube in the event of changes in the battery supply voltages. Small filament voltage changes will have a marked effect on the performance of the electrometer and for accurate measurements these changes must be eliminated.

Switch 112 is connected to the circuit 89, 90 and controls the on and off functions of the system.

The total accumulated dose subsystem utilizes the second collecting electrode 114 in the ionization chamber 47. An appropriate charge collection and amplification system provides the output for the subsystem. Referring again to FIGS. 4, 5 and 6, the ionization current from the sensor (electrode 114) is used to charge capacitor 116 to a fully charged condition. When the capacitor is fully charged, the gate of the conventional N channel (MOSFET) field effect transistor 118 is driven more positive. The voltage across resistor 120 is thereby increased. This results in shutting (N channel MOSFET) transistor 122 off, causing a decreased voltage drop across resistor 124 and the gate of transistor 126 to become more positive. This in turn results in a dimished voltage drop across resistors 128 and 130, and the gate of transistor 132 to experience a voltage drop. The source of 132 is driven more positive showing a voltage use at the output 92 and 93.

The signal, with respect to the output 92 and 93 (FIG. 4) is further amplified by transistor 134 (FIG. 5). Transistor 134 is a conventional compound transistor amplifier with a gain of 70,000. The transistor (134) acts as a driver amplifier for the mechanical register 136. Each charge up of capacitor 116 advances the register by one count or digit. Additionally, when 92 becomes positive, transistor 134 is heavily conductive dropping the base voltage of transistor 138 rendering it more conductive causing the relay 140 (physically located in the register 136) to close. This in turn shorts capacitor 116 out and prepares the total does system for further operation and the circuit is completed through points 96. Switch 142 controls the on-off functions for the total dose sub-system.

The total dose system is calibrated by exposing the sensor to a standard known total dose. This produces a fixed number of electrical pulses and advances the register by a known number of pulses. Resistor 120 may be adjusted so that one rad measured on the meter 100 corresponds to one pulse on the register.

The electrical power is supplied by a battery pack 144 which utilizes combinations of mercury cells to achieve the indicated voltages. Contact 94 supplies a +50 volts to the high voltage electrode of the sensor 47, and contact 95 supplies 6.75 volts to the total dose amplifying subsystem.

Obviously, many modifications and variations of the present invention are possible in the light of the above teachings. It is therefore to be understood that within the scope of the appended claims the invention may be practiced otherwise than as specifically described.

What is claimed is:

1. A portable hand held dosimeter comprising in combination: a shaped, impact-resistant, non-metalic case; means mounted on said case for detecting dose rate in a mixed radiation field, including a tissue equivalent ionization chamber; means for displaying dose rate; a first electronic circuit means connecting the dose rate detecting means and the display means including a battery, a logarithmic electrometer means connected to the dose rate detecting means for amplifying current generated therein, differential amplifier means connected to said electrometer means for amplifying the output thereof, voltmeter means connected to said differential amplifier and variable resistor means connected to the volt meter for calibrating the volt meter to the electrometer means; means mounted on said case for detecting total radiation dose in a mixed radiation field; means for indicating the total radiation dose; a second electronic circuit means connecting the total radiation dose detecting means and said indicating means; means located on said case for switching dosimeter power on and off, and switch means located on said case for activating the dose indicating means.

2. A portable hand held dosimeter comprising in combination: a shaped, impact-resistant, non-metalic case; means mounted on said case for detecting dose rate in a mixed radiation field, including a tissue equivalent ionization chamber; means for displaying dose rate; a first electronic circuit means connecting the dose rate detecting means and the display means; means for detecting total radiation dose mounted on said case; means for indicating the total radiation dose; a second electronic circuit means connecting the total radiation dose detecting means and said indicating means, including a battery, a capacitor connected to the total dose detecting means, a field effect transistor switching system connected to the capacitor to allow the capacitor to be charged by the total radiation dose detecting means and discharged; a compound transistor amplifier network means connected to the capacitor to operate the total dose indicating means each time the said capacitor is charged; means located on said case for switching dosimeter power on and off, and switch means located on said case for activating the dose indicating means.

\* \* \* \* \*